United States Patent
Rocci et al.

(10) Patent No.: US 11,417,155 B2
(45) Date of Patent: Aug. 16, 2022

(54) ON-BOARD DATA REQUEST APPROVAL MANAGEMENT

(71) Applicant: FORD GLOBAL TECHNOLOGIES, LLC, Dearborn, MI (US)

(72) Inventors: Benjamin M. Rocci, Ann Arbor, MI (US); Christian Krozal, South Lyon, MI (US); Mark Anthony Rockwell, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 360 days.

(21) Appl. No.: 16/566,358

(22) Filed: Sep. 10, 2019

(65) Prior Publication Data

US 2021/0074083 A1   Mar. 11, 2021

(51) Int. Cl.
*G07C 5/00* (2006.01)
*G06F 21/62* (2013.01)
*H04L 12/28* (2006.01)
*H04L 67/12* (2022.01)
*G07C 5/08* (2006.01)

(52) U.S. Cl.
CPC ............. *G07C 5/008* (2013.01); *G06F 21/62* (2013.01); *G07C 5/08* (2013.01); *G06F 2221/2143* (2013.01); *H04L 12/28* (2013.01); *H04L 67/12* (2013.01)

(58) Field of Classification Search
USPC ...................................... 701/31.4
See application file for complete search history.

(56) References Cited

U.S. PATENT DOCUMENTS

| | | | | |
|---|---|---|---|---|
| 9,870,656 | B2* | 1/2018 | Katta | G07C 5/085 |
| 9,961,551 | B2* | 5/2018 | Scholl | H04W 4/40 |
| 2003/0134631 | A1* | 7/2003 | Snyder | H04L 43/12 |
| | | | | 455/423 |
| 2015/0094903 | A1* | 4/2015 | Bell | G07C 5/0808 |
| | | | | 701/31.4 |
| 2015/0094929 | A1* | 4/2015 | Bell | G07C 5/008 |
| | | | | 701/99 |
| 2015/0298654 | A1* | 10/2015 | Joao | G01S 19/13 |
| | | | | 701/2 |

(Continued)

FOREIGN PATENT DOCUMENTS

DE   102020123095 A1 *   3/2021   ............. H04W 4/40

*Primary Examiner* — Tyler D Paige
(74) *Attorney, Agent, or Firm* — Michael J. Spenner; Brooks Kushman P.C.

(57) ABSTRACT

Data elements are identified, from a diagnostic request received from a remote server, to collect from controllers of the vehicle. The data elements are captured for inclusion in a diagnostic data message, responsive to receipt of the diagnostic request to allow the data elements to be collected without approval of the diagnostic request. The data elements are stored to the data storage. The remote server is queried for an approval status of the diagnostic request. Responsive to the approval status specifying that the diagnostic request is approved, the diagnostic data message is sent to the server. Responsive to the approval status failing to specify within a predefined time period that the diagnostic request is approved, the data elements are discarded from the data storage to maintain data privacy for the diagnostic request upon condition that the diagnostic request is not approved.

20 Claims, 2 Drawing Sheets

(56) References Cited

U.S. PATENT DOCUMENTS

| | | | |
|---|---|---|---|
| 2016/0197932 A1* | 7/2016 | Hoffman | H04L 63/1408 |
| | | | 726/4 |
| 2016/0328890 A1* | 11/2016 | Keane | G07C 5/0808 |
| 2017/0011561 A1* | 1/2017 | Makke | G07C 5/085 |
| 2017/0063842 A1* | 3/2017 | Ahn | H04L 63/0823 |
| 2018/0081670 A1* | 3/2018 | Caushi | H04L 67/34 |
| 2018/0257683 A1* | 9/2018 | Govindappa | B61L 27/0077 |
| 2019/0205539 A1* | 7/2019 | Liu | G06F 21/572 |
| 2019/0371091 A1* | 12/2019 | Frisch | G07C 5/0808 |
| 2021/0320794 A1* | 10/2021 | Auh | H04L 9/0836 |

* cited by examiner

ON-BOARD DATA REQUEST APPROVAL MANAGEMENT

TECHNICAL FIELD

Aspects of the disclosure generally relate to on-board data request approval management for vehicle diagnostic requests.

BACKGROUND

Automobile diagnostic data, such as Diagnostic Trouble Codes (DTCs), form compact, informative messages. Diagnostic data was designed to allow vehicle controllers to indicate a system fault and/or a need for repair.

SUMMARY

In one or more illustrative examples, a system includes a storage configured to maintain diagnostic data of the vehicle; and a processor programmed to identify, from a diagnostic request received from a remote server, data elements to collect from controllers of the vehicle, capture the data elements for inclusion in a diagnostic data message, responsive to receipt of the diagnostic request, to allow the data elements to be collected without approval of the diagnostic request, store the data elements to the data storage, query the remote server for an approval status of the diagnostic request, responsive to the approval status specifying that the diagnostic request is approved, send the diagnostic data message to the server, and responsive to the approval status failing to specify within a predefined time period that the diagnostic request is approved, discard the data elements from the data storage, thereby maintaining data privacy for the diagnostic request upon condition that the diagnostic request is not approved.

In one or more illustrative examples, a method for on-board data request approval management for vehicle diagnostic requests includes identifying, from a diagnostic request received from a remote server, data elements to collect from controllers of the vehicle; capturing the data elements for inclusion in a diagnostic data message, responsive to receipt of the diagnostic request to allow the data elements to be collected without approval of the diagnostic request; storing the data elements to a data storage maintaining diagnostic data of the vehicle; querying the remote server for an approval status of the diagnostic request; responsive to the approval status specifying that the diagnostic request is approved, sending the diagnostic data message to the server; and responsive to the approval status failing to specify within a predefined time period that the diagnostic request is approved, discarding the data elements from the data storage to maintain data privacy for the diagnostic request upon condition that the diagnostic request is not approved.

In one or more illustrative examples, a non-transitory computer-readable medium includes instructions that, when executed by a processor of a vehicle data server, cause the processor to identify, from a diagnostic request received from a remote server over a wide-area network, data elements to collect from controllers of the vehicle; capture the data elements for inclusion in a diagnostic data message, responsive to receipt of the diagnostic request to allow the data elements to be collected without approval of the diagnostic request; store the data elements to a data storage maintaining diagnostic data of the vehicle; periodically query the remote server over the wide-area network for an approval status of the diagnostic request within a predefined time period; responsive to the approval status specifying that the diagnostic request is approved, send the diagnostic data message to the server over the wide-area network; and responsive to the approval status failing to specify within a predefined time period that the diagnostic request is approved or indicating that the diagnostic request is rejected, discard the data elements from the data storage to maintain data privacy for the diagnostic request upon condition that the diagnostic request is not approved.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Connected vehicle data requests often require internal approvals before being executed to a fleet of vehicles. If not expedited or handled efficiently, the internal approval process may take weeks. If the connected vehicle data request is urgent or time sensitive, by the time the request is executed to vehicles and the data is collected, the data may not be as meaningful. As an example, if engineers make a connected vehicle data request to learn more about an issue occurring during a heat wave, it is important that the data be captured while the weather conditions still exist, otherwise the data is of little use.

As described in detail herein, an approach may be implemented to capture vehicle data immediately upon an engineer's request, while still maintaining the controls needed to uphold business processes, such as internal sign-off influenced by country-specific data privacy laws and policies, for offload and use of the data.

Data requests may be delivered to the vehicle, where the data requests include or are otherwise associated with a dedicated field for approval status. If the data request is sent to the vehicle with an approved status, the vehicle may execute the data request and immediately offload the requested data. If the data request is sent to the vehicle with a waiting-for-approval status, the vehicle may execute the data request but may also hold the collected data in on-board storage rather than offload the data. The vehicle may then periodically check in with the backend to receive the latest approval status for the data request. If the vehicle receives an approved status, the diagnostic data may be offloaded from memory. If the vehicle receives a rejected status, the diagnostic data held in storage may be destroyed. If an approved request is not received within a predefined timeframe, the request will timeout and the diagnostic data may be destroyed.

This approach allows the vehicle diagnostic data to be collected at the time when it is most relevant to engineers, without sacrificing important business controls for customer privacy and other concerns. While the requested diagnostic data is sitting in on-board vehicle storage, the company's internal governance process can play out.

Figure 1:
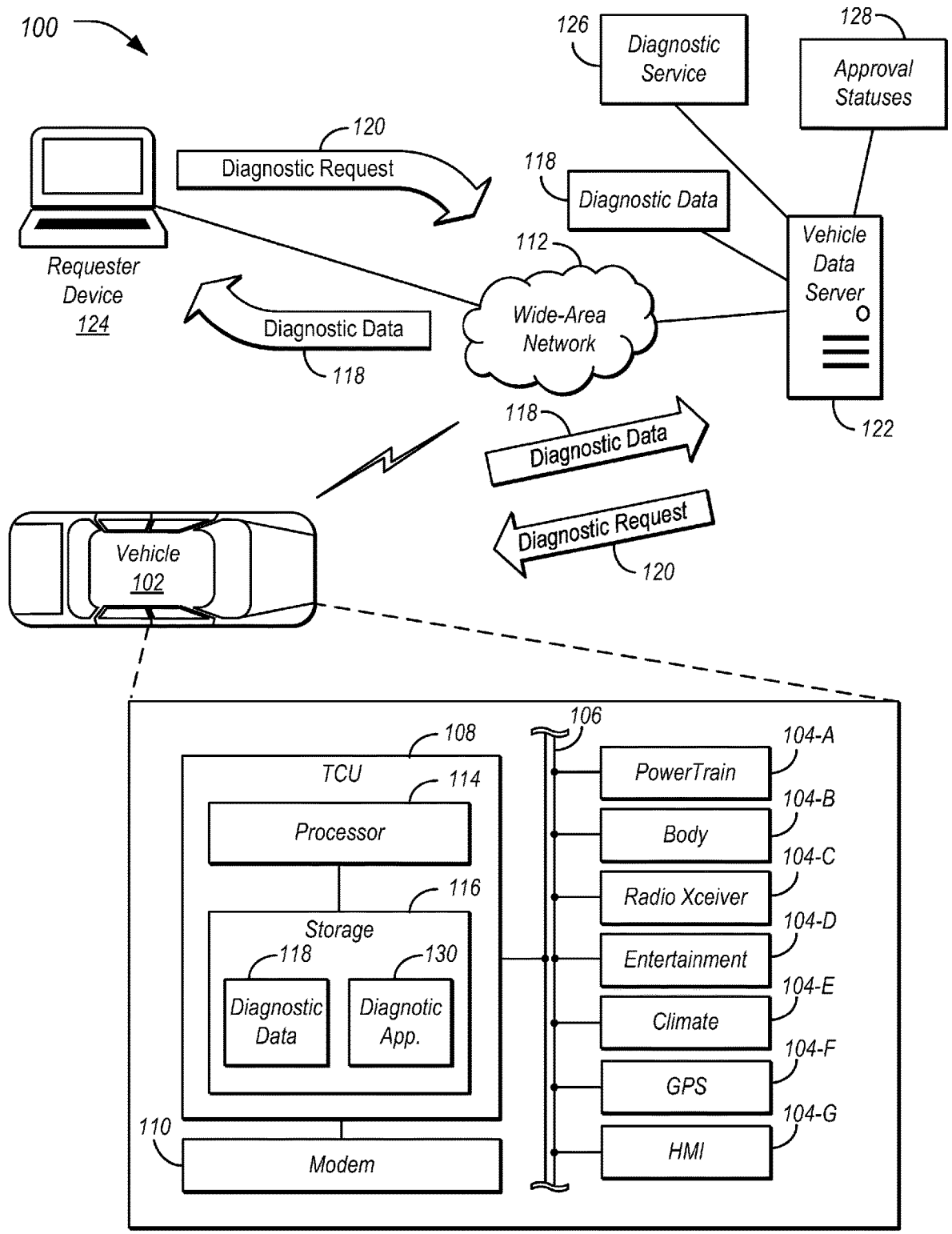
FIG. 1 illustrates an example system implementing on-board data request approval management for vehicle diagnostic requests.

FIG. 1 illustrates an example system 100 implementing on-board data request approval management for vehicle diagnostic requests. As illustrated, a vehicle 102 includes a plurality of vehicle controllers 104 in communication over one or more vehicle buses 106. The system 100 also includes a vehicle data server 122 configured to facilitate the retrieval of diagnostic data 118 from various vehicles 102. A requester device 124 may be used by engineers or other personnel to send diagnostic requests 120 to the vehicle data server 122, which may be reviewed and forwarded onto the vehicles 102. The vehicle 102 further includes a telematics control unit (TCU) 108 configured to receive diagnostic requests 120 from the vehicle data server 122 as well as to send diagnostic data 118 to the vehicle data server 122. The TCU 108 may utilize a diagnostic application 130 installed to the TCU 108 to process the diagnostic requests 120 that define data to be retrieved from the vehicle 102, as well as to capture and send diagnostic data 118 to the vehicle data server 122. The vehicle data server 122 may further maintain approval statuses 128 for the diagnostic requests 120, which may be used to define whether the vehicle 102 is authorized to send the diagnostic data 118 for retrieval. It should be noted that the system 100 is merely an example, and other arrangements or combinations of elements may be used.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a battery electric vehicle (BEV) powered by one or more electric motors. As a further possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the capabilities of the vehicle 102 may correspondingly vary. As some other possibilities, vehicles 102 may have different capabilities with respect to passenger capacity, towing ability and capacity, and storage volume. For title, inventory, and other purposes, vehicles 102 may be associated with unique identifiers, such as VINs.

The vehicle 102 may include a plurality of controllers 104 configured to perform and manage various vehicle 102 functions under the power of the vehicle battery and/or drivetrain. As depicted, the example vehicle controllers 104 are represented as discrete controllers 104-A through 104-G. However, the vehicle controllers 104 may share physical hardware, firmware, and/or software, such that the functionality from multiple controllers 104 may be integrated into a single controller 104, and that the functionality of various such controllers 104 may be distributed across a plurality of controllers 104.

As some non-limiting vehicle controller 104 examples: a powertrain controller 104-A may be configured to provide control of engine operating components (e.g., idle control components, fuel delivery components, emissions control components, etc.) and for monitoring status of such engine operating components (e.g., status of engine codes); a body controller 104-B may be configured to manage various power control functions such as exterior lighting, interior lighting, keyless entry, remote start, and point of access status verification (e.g., closure status of the hood, doors and/or the trunk of the vehicle 102); a radio transceiver controller 104-C may be configured to communicate with key fobs, mobile devices, or other local vehicle 102 devices; an entertainment controller 104-D may be configured to support voice command and BLUETOOTH interfaces with the driver and driver carry-on devices; a climate control management controller 104-E may be configured to provide control of heating and cooling system components (e.g., compressor clutch, blower fan, temperature sensors, etc.); a global positioning system (GPS) controller 104-F may be configured to provide vehicle location information; and a human-machine interface (HMI) controller 104-G may be configured to receive user input via various buttons or other controls, as well as provide vehicle status information to a driver, such as fuel level information, engine operating temperature information, and current location of the vehicle 102.

The vehicle bus 106 may include various methods of communication available between the vehicle controllers 104, as well as between the TCU 108 and the vehicle ECUs 104. As some non-limiting examples, the vehicle bus 106 may include one or more of a vehicle controller area network (CAN), an Ethernet network, and a media-oriented system transfer (MOST) network. Further aspects of the layout and number of vehicle buses 106 are discussed in further detail below.

The TCU 108 may include network hardware configured to facilitate communication between the vehicle ECUs 104 and with other devices of the system 100. For example, the TCU 108 may include or otherwise access a cellular modem 110 configured to facilitate communication with a wide-area network 112. The wide-area network 112 may include one or more interconnected communication networks such as the Internet, a cable television distribution network, a satellite link network, a local area network, and a telephone network, as some non-limiting examples. As another example, the TCU 108 may utilize one or more of BLUETOOTH, Wi-Fi, or wired USB network connectivity to facilitate communication with the wide-area network 112 via the user's mobile device.

The TCU 108 may further include various types of computing apparatus in support of performance of the functions of the TCU 108 described herein. In an example, the TCU 108 may include one or more processors 114 configured to execute computer instructions, and a storage 116 medium on which the computer-executable instructions and/or data may be maintained. A computer-readable storage medium (also referred to as a processor-readable medium or storage 116) includes any non-transitory (e.g., tangible) medium that participates in providing data (e.g., instructions) that may be read by a computer (e.g., by the processor(s)). In general, the processor 114 receives instructions and/or data, e.g., from the storage 116, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, JAVA, C, C++, C#, FORTRAN, PASCAL, VISUAL BASIC, PYTHON, JAVA SCRIPT, PERL, PL/SQL, etc.

The TCU 108 may be configured to include one or more interfaces from which vehicle information may be sent and received. In an example, the TCU 108 may be configured to facilitate the collection of DTC data and/or other vehicle information from the vehicle controllers 104 connected to the one or more vehicle buses 106. While only a single bus 106 is illustrated, it should be noted that in many examples, multiple vehicle buses 106 are included, with a subset of the controllers 104 connected to each bus 106. Accordingly, to access a given controller 104, the TCU 108 may be configured to maintain a mapping of which buses 106 are connected to which controllers 104, and to access the corresponding bus 106 for a controller 104 when communication with that particular controller 104 is desired.

The collected information retrieved from the controllers 104 over the vehicle buses 106 may be referred to as diagnostic data 118. The information retrieved by the TCU 108 may include, as some non-limiting examples, accelerator pedal position, steering wheel angle, vehicle speed, vehicle location (e.g., GPS coordinates, etc.), vehicle unique identifier (e.g., VIN), engine revolutions per minute (RPM), and vehicle HMI information, such as steering wheel button press information.

The TCU 108 may store the collected diagnostic data 118 to the storage 116 of the TCU 108 as shown. Thus, diagnostic data 118 may include collected DTC information and/or other vehicle information that is stored to the storage 116 of the TCU 108. It should be noted, however, that in other examples, the TCU 108 may be configured to utilize other storage in communication with the TCU 108, such as storage of one or more of the controllers 104. As one non-limiting alternative, responsive to receipt of a diagnostic request 120, the TCU 108 may direct the controllers 104 to maintain data that may be required later for retrieval to send on in the diagnostic data 118.

The diagnostic requests 120 include information defining diagnostic elements, codes, or other information to be captured from the vehicles 102. The diagnostic requests 120 may be sent to the vehicle 102, and the vehicle 102 may return the diagnostic data 118 in response. Diagnostic requests 120 may be used to define the diagnostic codes or other information that is to be included in the diagnostic data 118. The diagnostic requests 120 may further specify attributes of the vehicles 102 that should provide diagnostic data 118. In an example, these attributes may include one or more of: a make of a vehicle 102, a model of a vehicle 102, a model year of a vehicle 102, a vehicle identification number (VIN) of a vehicle 102, or a VIN range of vehicle 102.

The vehicle data server 122 and a requester device 124 may each include various types of computing apparatus, such as a computer workstation, a server, a desktop computer, a virtual server instance executed by a mainframe server, or some other computing system and/or device. Similar to the TCU 108, the vehicle data server 122 and the requester device 124 generally include a memory on which computer-executable instructions may be maintained, where the instructions may be executable by one or more processors (not shown for clarity). Such instructions and other data may be stored using a variety of computer-readable media. In an example, the vehicle data server 122 may be configured to maintain the diagnostic data 118 received from the TCU 108 of the vehicles 102 by way of the network 112.

The requester device 124 may be used to allow an operator to configure the diagnostic requests 120 that are used by the vehicle data server 122 to retrieve diagnostic data 118 from vehicles 102. In an example, a user of the requester device 124 may specify one or more diagnostic codes to be captured from a set of vehicles 102. The user may also specify what vehicles 102 are intended to receive the diagnostic requests 120 (e.g., make, model, VIN range, etc.).

A diagnostic service 126 may be one application included on the storage of the vehicle data server 122. The diagnostic service 126 may include instructions that, when executed by one or more processors of the vehicle data server 122, cause the vehicle data server 122 to receive diagnostic requests 120 from the requester device 124, send the diagnostic requests 120 to the vehicles 102 specified by the requester device 124, receive the diagnostic data 118 information from vehicles 102, and provide the diagnostic data 118 back to the requester device 124.

The diagnostic service 126 may further be configured to manage approval status 128 of the diagnostic requests 120. The approval status 128 for a diagnostic request 120 refers to a status flag or code that indicates whether or not diagnostic data 118 corresponding to the diagnostic request 120 is allowed to be transmitted off the vehicle 102. In an example, the approval status 128 may be one of the following: a waiting-for-approval status, an approved status, or a rejected status. The waiting-for-approval status may indicate that a diagnostic request 120 was issued from a requester device 124, but the diagnostic request 120 has not been approved or otherwise signed off on to allow for the use of diagnostic data 118 from the diagnostic request 120 to be offloaded or used. The approved status indicates that diagnostic request 120 has been approved such that the diagnostic data 118 for the diagnostic request 120 can be offloaded from the vehicles 102. The rejected status indicates that diagnostic request 120 has been rejected such that the diagnostic data 118 for the diagnostic request 120 cannot be offloaded from the vehicles 102.

The diagnostic application 130 may be one application included on the storage 116 of the TCU 108. The diagnostic application 130 may include instructions that, when executed by the processor 114 of the TCU 108, cause the TCU 108 to perform functions periodically and/or in response to receipt of diagnostic requests 120 from the vehicle data server 122. These functions may include to collect the diagnostic data 118 information from the controllers 104 (e.g., including DTC information) based on the diagnostic requests 120 received from the vehicle data server 122, store the information for transmission, and transmit the diagnostic data 118 to the vehicle data server 122 over the wide-area network 112.

The diagnostic request 120 may include or otherwise be associated with an approval status 128 when the diagnostic request 120 is sent to the vehicle 102. This approval status 128 may be the waiting-for-approval status in many cases, as the diagnostic request 120 may be forwarded to the vehicles 102 before approval is received to save time. This approval status 128 may also be the approved status in some instances if a diagnostic request 120 is approved quickly. If a diagnostic request 120 comes to a vehicle 102 with the waiting-for-approval status, the diagnostic application 130 may also query the vehicle data server 122 to ensure that the diagnostic requests 120 reaches an approval status 128 of approved before allowing for the diagnostic data 118 to be transmitted off the vehicle 102. Further aspects of the behavior of the vehicle 102 with respect to the approval status 128 are described in detail with respect to FIG. 2.

Figure 2:
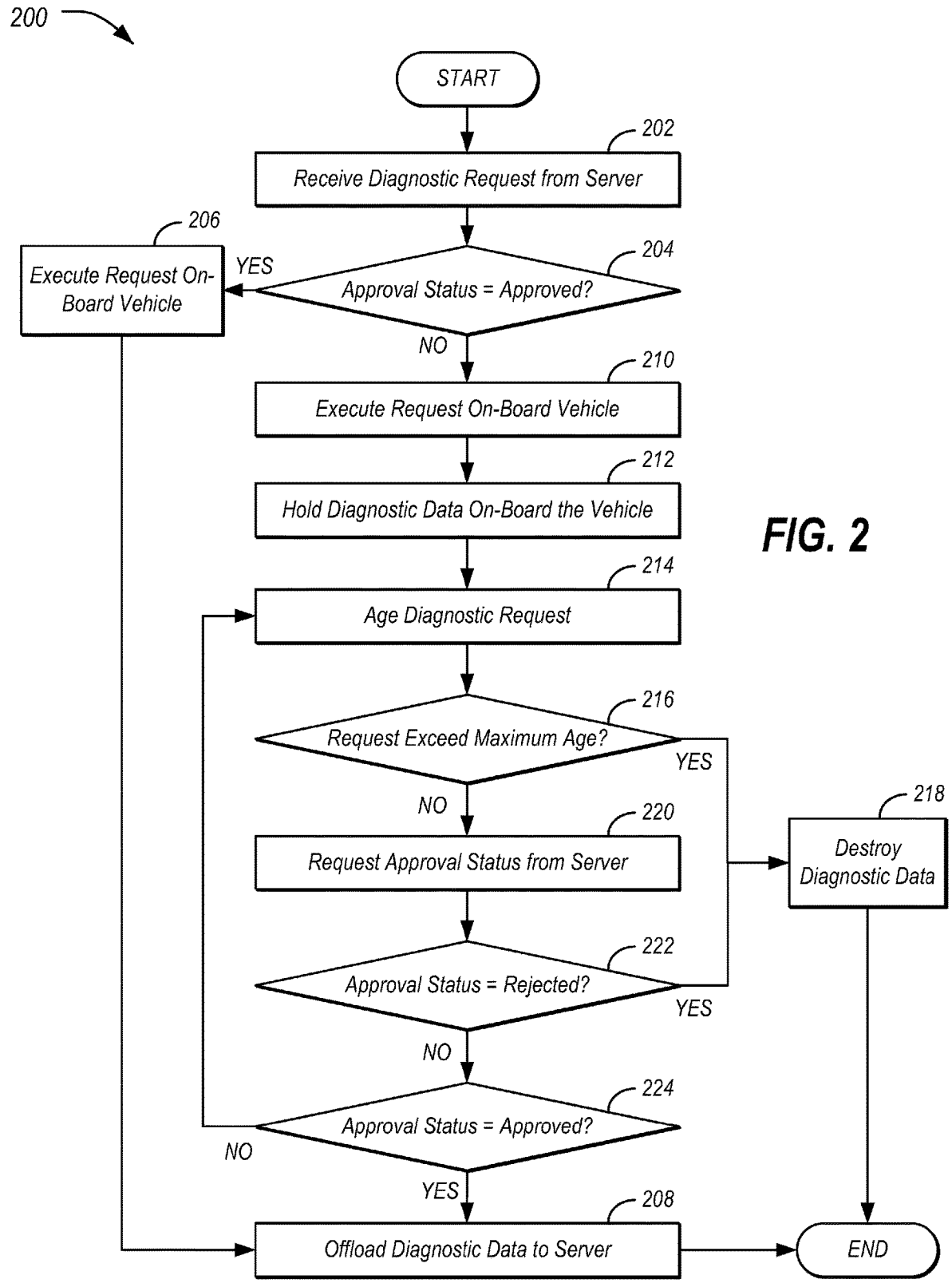
FIG. 2 illustrates an example process implementing on-board data request approval management for vehicle diagnostic requests.

FIG. 2 illustrates an example process 200 for implementing on-board data request approval management for vehicle diagnostic requests 120. In an example, the process 200 may be performed by the vehicle 102 described in the context of the system 100 that is executing the diagnostic application 130.

At operation 202, the vehicle 102 receives a diagnostic request 120 from the vehicle data server 122. In an example, the vehicle data server 122 may send one or more diagnostic requests 120 over the wide-area network 112 which are received by the TCU 108 of the vehicle 102. These diagnostic requests 120 may include information specified by the requester device 124, such as one or more of: which data elements are to be collected by the vehicle 102, a frequency of collection of the specified data elements, trigger conditions to perform collection of the specified data elements, and the approval status 128 of the diagnostic request 120. This information may be provided to the diagnostic application 130.

At 204, the vehicle 102 determines whether the diagnostic request 120 is of an approval status 128 of approved. In an example, the diagnostic request 120 may include or otherwise be associated with an initial approval status 128. In many cases, this initial approval status 128 may be a waiting-for-approval status, while in other cases it may be the approved status. If the diagnostic request 120 is of the approved status, control passes to operation 206. Otherwise, if the diagnostic request 120 is in the waiting-for-approval status, control passes to operation 210. In general, the vehicle 102 should not receive a diagnostic request 120 that is in the rejected status, but if this were to occur, then the process 200 may simply end at operation 204 (and/or potentially indicate an error condition regarding the approval status 128 to the vehicle data server 122). In some examples, if there is no approval status 128 included in or associated with the approval status 128, it is possible that the vehicle 102 may initially query the vehicle data server 122 for the approval status 128. However, in other examples, were this to occur the vehicle 102 may assume that the approval status 128 is the waiting-for-approval status.

The vehicle 102 executes the diagnostic request 120 on-board the vehicle 102 at operation 206. In an example, the vehicle 102 collects diagnostic data 118 using the timing, cadence, and/or triggers for each of the data elements as specified by the diagnostic request 120. In an example, the diagnostic application 130 directs the TCU 108 to collect DTC data and/or other vehicle information from the vehicle ECUs 104 connected to the one or more vehicle buses 106, to satisfy the requested data elements from the diagnostic request 120. In some examples, the vehicle 102 may include a plurality of vehicle buses 106, and the diagnostic application 130 may determine over which vehicle bus 106 each data element is to be retrieved.

At operation 208, the vehicle 102 offloads the diagnostic data 118 to the vehicle data server 122. In an example, the vehicle 102 sends the diagnostic data 118 as collected to the vehicle data server 122 over the wide-area network 112 or via another suitable network. After operation 208, the process 200 ends.

The vehicle 102 executes the diagnostic request 120 on-board the vehicle 102 at operation 210, as described at operation 206. However, as opposed to the operation 206, following operation 210 control proceeds to operation 212.

At 212, the vehicle 102 holds the diagnostic data 118 on-board the vehicle 102. In an example, the diagnostic application 130 may store the collected diagnostic data 118 to the storage 116 of the TCU 108. In another example, the diagnostic application 130 may additionally or alternately utilize other storage in communication with the TCU 108, such as storage of one or more of the controllers 104.

At 214, the vehicle 102 ages the diagnostic request 120. In an example, the diagnostic application 130 may wait a predefined period of time from receipt of the diagnostic request 120 before querying the vehicle data server 122 for an updated approval status 128. As some examples, the predefined period of time may be twelve hours, or a day, or two days, or a week. As another possibility, the update may be triggered responsive to other criteria, such as responsive to the vehicle 102 traveling a predefined distance, or the vehicle 102 being restarted a predefined number of times.

At 216, the vehicle 102 determines whether the diagnostic request 120 has exceeded a maximum age for diagnostic requests 120. In an example, the vehicle 102 may determine whether a predefined maximum timeout period has expired since receipt of the diagnostic request 120. As some examples, this maximum timeout may be a day, a week, or a month. In another example, the diagnostic request 120 may itself specify a maximum timeout period after which if the diagnostic request 120 has not been approved the data may be discarded. (In some examples, the vehicle 102 may always trigger to perform one final query for an updated approval status 128 responsive to expiration of the diagnostic request 120.) If the diagnostic request 120 has exceeded the maximum age, control passes to operation 218. Otherwise, control continues to operation 220.

At 218, the vehicle 102 destroys any diagnostic data 118 collected with respect to the diagnostic request 120. Accordingly, data that was collected by the vehicle 102 for a diagnostic request 120 that was ultimately never approved will not make it off the vehicle 102. After operation 218, the process 200 ends.

At operation 220, the vehicle 102 requests the approval status 128 corresponding to the diagnostic request 120. In an example, the diagnostic application 130 queries the vehicle data server 122 over the wide-area network 112 for an updated approval status 128. The vehicle 102 may receive the approval status 128 from the vehicle data server 122 responsive to the request. Notably, if the vehicle data server 122 fails to respond, retries may be performed, but lacking a response from the vehicle data server 122 may be interpreted simply as meaning that the status is still waiting-for-approval status, to allow for further attempts to be performed later at the next aging cycle.

The vehicle 102 determines, at operation 222, whether the approval status 128 is rejected. If so, control passes to operation 218 to destroy the diagnostic data 118 collected responsive to the diagnostic request 120. Additionally, the vehicle 102 determines whether the approval status 128 is approved at operation 224. If so, control passes to operation 208 to offload the diagnostic data 118 to the vehicle data server 122. If not, control returns to operation 214 to again age the diagnostic request 120.

Thus, the disclosed systems and methods solves issues with retrieving diagnostic data 118 from vehicles 102 while maintaining data privacy, by allowing the vehicle data to be collected at the time at which it is most relevant to engineers, without sacrificing important business controls for customer privacy and other concerns.

Computing devices described herein, such as the TCU 108, vehicle data server 122, and requester device 124, generally include computer-executable instructions where the instructions may be executable by one or more computing devices such as those listed above. Computer-executable instructions, such as those of the diagnostic application 130 or diagnostic service 126, may be compiled or interpreted from computer programs created using a variety of programming languages and/or technologies, including, without limitation, and either alone or in combination, JAVA™, C, C++, C#, VISUAL BASIC, JAVASCRIPT, PYTHON, PERL, PL/SQL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. A vehicle comprising:
    a data storage configured to maintain diagnostic data of the vehicle; and
    a processor programmed to
        identify, from a diagnostic request received from a remote server, data elements to collect from controllers of the vehicle, the controllers being connected to one or more vent buses of the vehicle, the data elements including diagnostic trouble code (DTC) data and/or other vehicle information to be collected from the controllers,
        capture the data elements for inclusion in a diagnostic data message via the one or more vehicle buses of the vehicle, responsive to receipt of the diagnostic request, to allow the data elements to be collected without approval of the diagnostic request,
        store the data elements to the data storage,
        query the remote server for an approval status of the diagnostic request,
        responsive to the approval status specifying that the diagnostic request is approved, send the diagnostic data message to the server, and
        responsive to the approval status failing to specify within a predefined time period that the diagnostic request is approved, discard the data elements from the data storage, thereby maintaining data privacy for the diagnostic request upon condition that the diagnostic request is not approved.

2. The vehicle of claim 1, wherein the approval status failing to specify that the diagnostic request is approved within a predefined period includes the approval status indicating that the diagnostic request is rejected.

3. The vehicle of claim 1, wherein the processor is further programmed to periodically query the remote server, within the predefined time period, for the approval status of the diagnostic request.

4. The vehicle of claim 1, wherein the predefined time period is counted from one of a time of receipt of the diagnostic request by the vehicle or a time of sending of the diagnostic request from the remote server.

5. The vehicle of claim 1, wherein the predefined time period is specified in the diagnostic request.

6. The vehicle of claim 1, wherein the processor is included in a telematics controller of the vehicle.

7. The vehicle of claim 6, wherein the data storage is included in the telematics controller of the vehicle.

8. The vehicle of claim 6, wherein the telematics controller is configured to receive the diagnostic request and the approval status from the server over a wide-area network and send the diagnostic data to the server over the wide-area network.

9. The vehicle of claim 1, wherein the processor is further programmed to utilize controller storage of at least a subset of the controllers of the vehicle as the data storage.

10. A method for on-board data request approval management for vehicle diagnostic requests comprising:
    identifying, from a diagnostic request received from a remote server, data elements to collect from controllers of a vehicle, the controllers being connected to one or more vehicle buses of the vehicle, the data elements including diagnostic trouble code (DTC) data and/or other vehicle information to be collected from the controllers;

capturing the data elements for inclusion in a diagnostic data message via the one or more vehicle buses of the vehicle, responsive to receipt of the diagnostic request, to allow the data elements to be collected without approval of the diagnostic request;

storing the data elements to a data storage maintaining diagnostic data of the vehicle;

querying the remote server for an approval status of the diagnostic request;

responsive to the approval status specifying that the diagnostic request is approved, sending the diagnostic data message to the server; and responsive to the approval status failing to specify within a predefined time period that the diagnostic request is approved, discarding the data elements from the data storage to maintain data privacy for the diagnostic request upon condition that the diagnostic request is not approved.

11. The method of claim 10, wherein the approval status failing to specify that the diagnostic request is approved within a predefined period includes the approval status indicating that the diagnostic request is rejected.

12. The method of claim 10, further comprising periodically querying the remote server, within the predefined time period, for the approval status of the diagnostic request.

13. The method of claim 10, further comprising counting the predefined time period from one of a time of receipt of the diagnostic request by the vehicle or a time of sending of the diagnostic request from the remote server.

14. The method of claim 10, wherein the predefined time period is specified in the diagnostic request.

15. The method of claim 10, wherein a processor performing the method is included in a telematics controller of the vehicle.

16. The method of claim 15, wherein the data storage is included in the telematics controller of the vehicle.

17. The method of claim 15, further comprising receiving the diagnostic request and the approval status from the server over a wide-area network and sending the diagnostic data to the server over the wide-area network.

18. The method of claim 15, further comprising utilizing controller storage of at least a subset of the controllers of the vehicle as the data storage.

19. A non-transitory computer-readable medium comprising instructions that, when executed by a processor of a vehicle, cause the vehicle to:

identify, from a diagnostic request received from a remote server over a wide-area network, data elements to collect from controllers of the vehicle, the controllers being connected to one or more vehicle buses of the vehicle, the data elements including diagnostic trouble code (DTC) data and/or other vehicle information to be collected from the controllers;

capture the data elements for inclusion in a diagnostic data message via the one or more vehicle buses of the vehicle, responsive to receipt of the diagnostic request, to allow the data elements to be collected without approval of the diagnostic request;

store the data elements to a data storage maintaining diagnostic data of the vehicle;

periodically query the remote server, within a predefined time period, over the wide-area network for an approval status of the diagnostic request;

responsive to the approval status specifying that the diagnostic request is approved, send the diagnostic data message to the server over the wide-area network; and responsive to the approval status failing to specify within the predefined time period that the diagnostic request is approved or indicating that the diagnostic request is rejected, discard the data elements from the data storage to maintain data privacy for the diagnostic request upon condition that the diagnostic request is not approved.

20. The medium of claim 19, wherein one or more of:

the predefined time period is counted from a time of receipt of the diagnostic request by the vehicle;

the predefined time period is counted from a time of sending of the diagnostic request from the remote server; and the predefined time period is specified in the diagnostic request.

* * * * *